United States Patent
Ozawa et al.

(10) Patent No.: US 8,484,448 B2
(45) Date of Patent: *Jul. 9, 2013

(54) INFORMATION PROCESSING DEVICE

(75) Inventors: Motokazu Ozawa, Kokubunji (JP); Naohiko Irie, Kokubunji (JP); Saneaki Tamaki, Kodaira (JP); Hisayoshi Ide, Kunitachi (JP); Miki Hayakawa, Kokubunji (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,023

(22) Filed: Feb. 17, 2012

(65) Prior Publication Data

US 2012/0151197 A1 Jun. 14, 2012

Related U.S. Application Data

(63) Continuation of application No. 12/124,232, filed on May 21, 2008, now Pat. No. 8,122,233, which is a continuation of application No. 10/849,063, filed on May 20, 2004, now Pat. No. 7,380,149.

(30) Foreign Application Priority Data

Jun. 20, 2003 (JP) .................. 2003-176100

(51) Int. Cl.
*G06F 9/00* (2006.01)
*G06F 15/177* (2006.01)

(52) U.S. Cl.
USPC ................ 713/1; 713/2; 713/320; 365/229

(58) Field of Classification Search
USPC .................. 713/1, 2, 320; 365/229
See application file for complete search history.

(56) References Cited

U.S. PATENT DOCUMENTS

| | | | |
|---|---|---|---|
| 749,533 A | 1/1904 | Cummins | |
| 774,990 A | 11/1904 | Newton | |

(Continued)

FOREIGN PATENT DOCUMENTS

| | | |
|---|---|---|
| EP | 1 359 510 | 11/2003 |
| JP | 63-314666 | 12/1988 |

(Continued)

OTHER PUBLICATIONS

T. Yamada, et al., "A 133MHz 170mW 10μA Standby Application Processor for 3G Cellular Phones", ISSCC 2002, Session 22, Multimedia Signal Processing, Feb. 6, 2002, pp. 370-371.

(Continued)

*Primary Examiner* — Kim Huynh
*Assistant Examiner* — Zahid Choudhury
(74) *Attorney, Agent, or Firm* — Antonelli, Terry, Stout & Kraus, LLP.

(57) ABSTRACT

Information processing system including a first and a second operation mode with operating current lower than the first, a register holding an address of an instruction executed by a processing unit first when a boot address register returns from second to first operation mode, wherein the address is output to the processing unit when second to first operation mode shifting, wherein the boot address register is rewritable, an information holding circuit holding a value of a peripheral circuit module register, wherein the information holding circuit holds, in the second operation mode, information about the peripheral circuit module register, and, transfers information held in the information holding circuit to the peripheral circuit module register regarding a second-to-first operation mode shift, and wherein when an interrupt request is posted from outside the system in the second operation mode, the information processing system performs interrupt processing corresponding to the interrupt request.

4 Claims, 12 Drawing Sheets

U.S. PATENT DOCUMENTS

| | | | |
|---|---|---|---|
| 794,479 | A | 7/1905 | Austin |
| 5,524,248 | A | 6/1996 | Parks et al. |
| 5,533,533 | A | 7/1996 | Shing |
| 5,737,616 | A | 4/1998 | Watanabe |
| 5,774,702 | A | 6/1998 | Mitsuishi et al. |
| 5,978,922 | A | 11/1999 | Arai et al. |
| 6,055,643 | A | 4/2000 | Chaiken |
| 6,973,004 | B2 | 12/2005 | Iwata et al. |
| 7,195,020 | B2 | 3/2007 | Bird |
| 7,380,149 | B2 | 5/2008 | Ozawa et al. |
| 7,484,512 | B2 | 2/2009 | Martinelli et al. |
| 7,730,330 | B1 | 6/2010 | Fleischmann et al. |
| 7,774,590 | B2 | 8/2010 | Borkar et al. |
| 2002/0091978 | A1 | 7/2002 | Higashida |
| 2003/0079152 | A1 | 4/2003 | Triece |
| 2003/0141926 | A1 | 7/2003 | Mizuno et al. |
| 2005/0114722 | A1 | 5/2005 | Tanaka et al. |
| 2005/0138452 | A1 | 6/2005 | Misaka et al. |
| 2005/0283626 | A1 | 12/2005 | Shikata |

FOREIGN PATENT DOCUMENTS

| | | |
|---|---|---|
| JP | 05-334074 | 12/1993 |
| JP | 08-234864 | 9/1996 |
| JP | 2002-196846 | 7/2002 |
| JP | 2002-341976 | 11/2002 |

OTHER PUBLICATIONS

Y. Kanno, et al., "µ/O Architecture for 0.13-µm Wide-Voltage-Range System-on-a-Package (SoP) Designs", 2002 Symposium on VLSI Circuits Digest of Technical Papers.

FIG.11

| POWER MODE | STATUS OF POWER | | | TRANSITION TRIGGER | RETURN TRIGGER | TIME FOR RETURN | OPERATING CURRENT |
|---|---|---|---|---|---|---|---|
| | AE1 | AE2 | AE3 | | | | |
| NORMAL | ON | ON | ON | | | | |
| S-STANDBY | ON (CLK OFF) | ON (CLK OFF) | ON | SETTING STBCR | EXTERNAL INTERRUPT | 100us ORDER | 10mA ORDER |
| R-STANDBY | OFF | ON (CLK OFF) | ON | SETTING STBCR | EXTERNAL INTERRUPT | 1ms ORDER | 100uA ORDER |
| U-STANDBY | OFF | OFF | ON | SETTING STBCR | RESET | 100ms ORDER | 10uA ORDER |
| POWER OFF | OFF | OFF | OFF | | | | |

INFORMATION PROCESSING DEVICE

CROSS REFERENCE TO RELATED APPLICATION

This is a continuation of U.S. application Ser. No. 12/124,232, filed May 21, 2008, now U.S. Pat. No. 8,122,233, which is a continuation of U.S. application Ser. No. 10/849,063, filed May 20, 2004 (now U.S. Pat. No. 7,380,149). This application relates to and claims priority from Japanese Patent Application No. 2003-176100, filed on Jun. 20, 2003. The entirety of the contents and subject matter of all of the above is incorporated herein by reference.

FIELD OF THE INVENTION

The present invention relates to an information processing device, and, more particularly, to an information processing device that has application in a system LSI or a microprocessor.

BACKGROUND OF THE INVENTION

Because a system LSI for a portable terminal, such as a personal digital assistant or a cellular phone, must be capable of long-sustained driving when powered by a battery, it is important to reduce the operating current thereof. In particular, a reduction of the standby current that constitutes an operating current of the device is important especially to determine the standby time of the personal digital assistant when the system LSI is in an idle state. Accordingly, various S-standby current reduction methods have been proposed and developed at present.

To begin with, in accordance with a first method (hereinafter referred to as a software standby), all clocks inside a system LSI are stopped in the standby mode. Because the clock inside the system LSI is stopped when the system LSI enters a standby state, the operating current is set to almost 0 by the circuit operation inside the system LSI. As a result, the standby current can be limited to only the operating current formed by a leakage current. Further, because this method can hold an internal state (such as the value of a register) of the system LSI even when the system LSI is standing by, return processing from a standby state can be performed by interrupt processing. As a result, the return processing is completed only as quickly as necessary for clock restart.

Because the leakage current has been exceedingly high in a miniaturized process in recent years, however, an operating current formed by the leakage current cannot be ignored. Accordingly, Non-Patent Document (Yamada et al., "A 133 MHz 170 mW 10 μA Standby Application Processor for 3G Cellular Phones", ISSCC 2002, February 6, pp. 370-371) describes a method (hereinafter referred to as a U-standby mode) in which the power of the system LSI is shut off in a standby mode. This method calls for shutting off the power, except for the minimum circuit necessary for recovery processing, when the system enters a standby state. As a result, the operating current caused by the leakage current, as well as the operating current caused by circuit operation, is set to almost 0 and the standby current can be set to almost 0.

The inventors have noticed that the following problems exist as a result of having examined the aforementioned two standby modes.

In the U-standby mode, the operating current formed by a leakage current as well as the operating current resulting from circuit operation, can be set to almost 0. Because the internal state (stored values) of a system LSI is lost by shutting off the power, however, return processing from a standby state cannot be performed by interrupt processing. Accordingly, the return processing must be performed by reset processing. Because reset processing requires initialization and startup of the system LSI, the time necessary for the return processing will be prolonged. In particular, in a software startup, because many instructions are to be executed, their processing time will be prolonged. Specifically, when the system LSI returns from the U-standby mode, the interrupt processing cannot be performed as is even if an interrupt request is posted. However, once the reset processing has been performed, and the software is started up, then the processing that corresponds to the aforementioned interrupt request can be performed.

On the contrary, because the internal state is held in a software standby mode, the software need not be started up. Though a return operation from a standby state is enabled at high speed, the operating current caused by a leakage current will increase as described above.

Thus, the inventor has found that the technology proposed at present makes it difficult to obtain a low standby current compatible with a return operation from a fast standby.

SUMMARY OF THE INVENTION

As a means for solving the aforementioned problems, an information processing device is provided with a first area, including a central processing unit and a peripheral circuit module, a second area having an information holding circuit for holding a value of a register contained in the peripheral circuit module, and a first power switch that controls the supply of a current to the first area and a second power switch that controls the supply of a current to the second area. When the information processing device operates in a first mode, the first and second power switches are controlled so that an operating current can be supplied to the first area and the second area. When the information processing device operates in a second mode, the first power switch is controlled so that the supply of the current to the first area can be shut off and the supply of the current to the second area is continued.

More desirably, the information holding circuit has a gate circuit. The gate circuit transmits, in the first mode, a value of the register contained in the peripheral circuit module, and limits, in the second mode, the transmission of the value of the register contained in the peripheral circuit module to the information holding circuit.

Further, as another means for solving the aforementioned problems, an information processing device is provided with a central processing unit and a peripheral circuit module. The information processing device can execute reset processing that sets an initial state of the information processing device; and, when an interrupt request is posted from the outside of the information processing device, it can execute interrupt processing that performs the processing corresponding to the interrupt request. The information processing device has a first operation mode in which a current is supplied to the central processing unit and the peripheral circuit module and a second operation mode in which the supply of the current to the central processing unit and the peripheral circuit module is stopped. The information processing device returns saved information to the central processing unit and the peripheral circuit module when an interrupt request is posted from the outside of the information processing device operating in the second operation mode, and then it can perform the interrupt processing that corresponds to the interrupt request.

Further, as yet another means for solving the aforementioned problems, an information processing device is provided with a central processing unit, a peripheral circuit module, and a boot address register. The information processing device has a first operation mode and a second operation mode, the operating current of which is lower than that of the first operation mode. The boot address register is provided, when the boot address register shifts from the first operation mode to the second operation mode, to set an address at which an instruction to be executed first is stored in the boot address register when the boot address register returns from the first operation mode to the second operation mode.

BRIEF DESCRIPTION OF THE DRAWINGS

FIG. 11 is a table showing a comparison between standbys;

DETAILED DESCRIPTION OF THE PREFERRED EMBODIMENTS

Preferred embodiments of an information processing device according to the present invention will be described below with reference to the appended drawings. Though the invention is not limited in particular, a circuit element that constitutes each block of an embodiment is formed on a semiconductor substrate, such as single crystal silicon by a known semiconductor integrated circuit technique for use in the manufacture of a CMOS (complementary MOS) transistor or a bipolar transistor.

Figure 1:
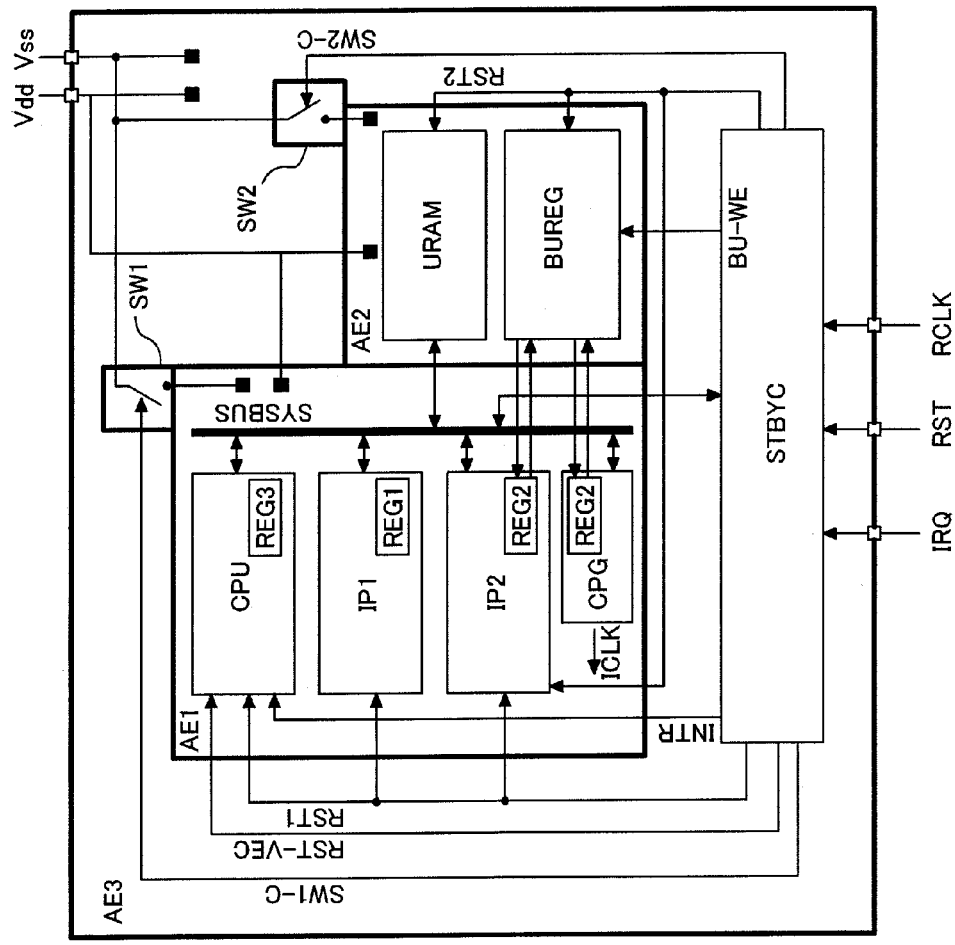
FIG. 1 is a block diagram of a system according to one embodiment of the present invention.

FIG. 1 shows one embodiment for realizing a low current mode (hereinafter referred to as an R-standby mode) in accordance with the present invention. FIG. 1 shows a conceptual illustration of a configuration in which the present invention is applied to an information processing device, in particular, a system LSI (or a microprocessor, and so forth). Though the invention is not limited in particular, the relevant system LSI is formed on a single semiconductor substrate.

This system LSI includes a first area AE1, a second area AE2, and a third area AE3, representing areas in which the power can be controlled independently. The first area AE1 includes a central processing unit CPU (hereinafter referred to as a CPU), peripheral circuit modules IP1 and IP2, a system bus SYSBUS, and a clock generation circuit CPG, and the supply of the current to this area is controlled by a power switch SW1. The second area AE2 includes an internal memory URAM (hereinafter referred to as a URAM) and a backup register BUREG, and the supply of the current to this area is controlled by a power switch SW2. Finally, the third area AE3 includes a standby control circuit STBYC, and it is conductively connected to receive power at all times. At this stage, the power switches SW1 and SW2 are arranged between ground potential Vss and the elements of each area, and they control the supply of current in their respective areas. Naturally, however, power switches can be arranged both between the ground potential Vss and the elements in each area and between the operating potential Vdd and the elements of each area.

The CPU controls the entirety of the system LSI. Further, though the invention is not limited in particular, the peripheral circuit module IP1 is not necessary when a CPU, such as an MPEG accelerator, fetches an instruction. The peripheral circuit module IP2 becomes necessary when the CPU, such as a bus state controller, fetches an instruction. The system bus SYSBUS connects each circuit module, including the CPU, and it includes a data bus and an address bus that are not shown in particular. A clock generation circuit CPG accepts a clock signal RCLK that is supplied from the outside, and it generates an internal clock signal ICLK. The internal clock signal ICLK is supplied to each circuit module, and the system LSI operates in accordance with the internal clock signal ICLK. The URAM is a high-capacity internal memory, and it holds necessary information, such as data, that is being processed at present. The backup register BUREG holds the value of a register REG2 contained in the peripheral circuit module IP2 in the R-standby mode. The present invention collects and arranges each circuit module contained in the first area AE1 and collects and arranges each circuit module contained in the second area AE2. Because the power switches SW1 and SW2 can be provided for multiple circuit modules in common by arranging them in this manner, the area can be reduced.

When the system LSI shifts to the R-standby mode, the power switch SW1 assumes an off state and the power switch SW2 assumes an on state. Accordingly, because the supply of current to the CPU, the peripheral modules IP1 and IP2 and the clock generation circuit CPG is shut off, the operating current can be reduced.

When the system LSI shifts to the R-standby mode, the internal information of the system LSI is saved to the URAM or the backup register BUREG. Subsequently, the power switch SW1 assumes the off state in response to a power switch control signal SW1-C so as to stop the supply of the current to each circuit module contained in the first area AE1. The power switch SW2 assumes the on state. Accordingly, because current is supplied to the circuit module contained in the second area AE2, the saved internal information of the system LSI is held. Interrupt processing can be performed by returning the information held in the URAM or backup register BUREG to the CPU, the IP1 and the IP2 according to an external interrupt request when the system LSI returns from the R-standby mode. When the interrupt request is posted, the power switch SW1 assumes the on state under control of the standby control circuit STBYC. After the current is supplied to the first area AE1, the saved internal information of the system LSI is returned to the CPU, IP1 and IP2. Because this operation is performed in a shorter time than the reset processing that starts up software, such as an OS, the information can be returned at a higher speed than the U-standby mode. In addition, the internal information of the system LSI can be saved to an external memory.

That is, one characteristic of the present invention is to divide an area so that the supply of current to a CPU and the peripheral circuit modules IP1 and IP2 can be shut off and the supply of the current to an information holding circuit, such as a URAM or backup register BUREG, can be continued when the system LSI shifts to the R-standby mode. This enables the information necessary for returning from the R-standby mode at high speed to be held.

Further, from a different point of view, interrupt processing is enabled for a return operation, although the value of a register indicating an internal state is lost by shutting off the supply of the current to the CPU and the peripheral circuit modules IP1 and IP2. This enables a return operation from the R-standby mode at high speed, because software, such as an OS, need not be started up while a standby mode of a low operating current is realized.

Further, this embodiment can employ another low current mode, for example, even a software standby mode or a U-standby mode, and it can set a low current mode flexibly according to the state of use of the system LSI. In the software standby mode, both the power switches SW1 and SW2 assume the on state and the current supply to a CPU and the peripheral circuit modules IP1 and IP2 is maintained. The supply of an internal clock signal ICKL is stopped and the circuit operation is stopped. Accordingly, because the circuit operation is stopped, the operating current is reduced. Subsequently, in the U-standby mode, both the power switches SW1 and SW2 assume the off state, and then the circuit operation is stopped and the supply of the current is shut off. Consequently, not only an operating current produced by the circuit operation, but also the operating current produced by a leakage current, can be reduced.

In addition, the method of the present invention is not limited depending on the types and the number of processors CPU or peripheral circuit modules IP1 and IP2, and the number of power areas, and it can be implemented in another configuration than that shown here. For example, because this embodiment has a software standby mode, a U-standby mode and the R-standby mode as low current modes, the power area is divided into three areas, but the U-standby mode can be omitted. In this case, the second area AE2 and the third area AE3 can be combined into one area, which can be conductively connected at all times. Further, this embodiment calls for shutting off the power using a switch located in a system LSI, but the power can be shut off through a power control circuit located outside the system LSI.

Figure 2:
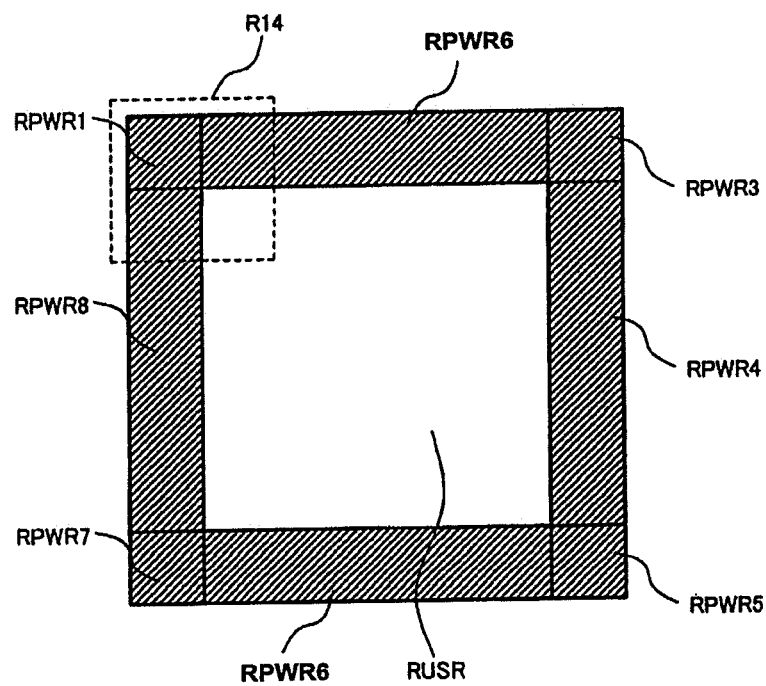
FIG. 2 is a diagram showing an example of the layout (floor plan) of an area AE1 shown in FIG. 1.

FIG. 2 shows a layout in which an area is divided as shown in FIG. 1, and it shows an example of a layout arrangement of the first area AE1 shown in FIG. 1. In the area RUSR, a MOS transistor constituting each circuit module contained in the area AE1 is arranged. In a ring-shaped area composed of RPWR1, RPWR2, RPWR3, RPWR 4, RPWR5, RPWR6, RPWR7, and RPWR8, a global power line, such as a power line VDD, a ground line VSS, or a virtual ground line VSSM, extends in a circle and is constituted by wiring of relatively thick wiring width so that a power ring is formed. Accordingly, the power line, ground line, and virtual ground line supplied to the MOS transistor constituting each circuit module are made to have a low resistance. The aforementioned power switch SW1 is connected between the ground line and virtual ground line, and the current is supplied to each circuit module via the virtual ground line VSSM. Although only the first area AE1 is described here, the second area AE2 is constituted in the same manner. Further, in this embodiment, the power switch SW1 is arranged between the ground line and the virtual ground line. Otherwise, a virtual power line is provided, and the power switch SW1 can be provided between the power line VDD and the virtual power line. In this case, the power switch SW1 can be provided or need not be provided between the ground line and the virtual ground line.

Figure 3:
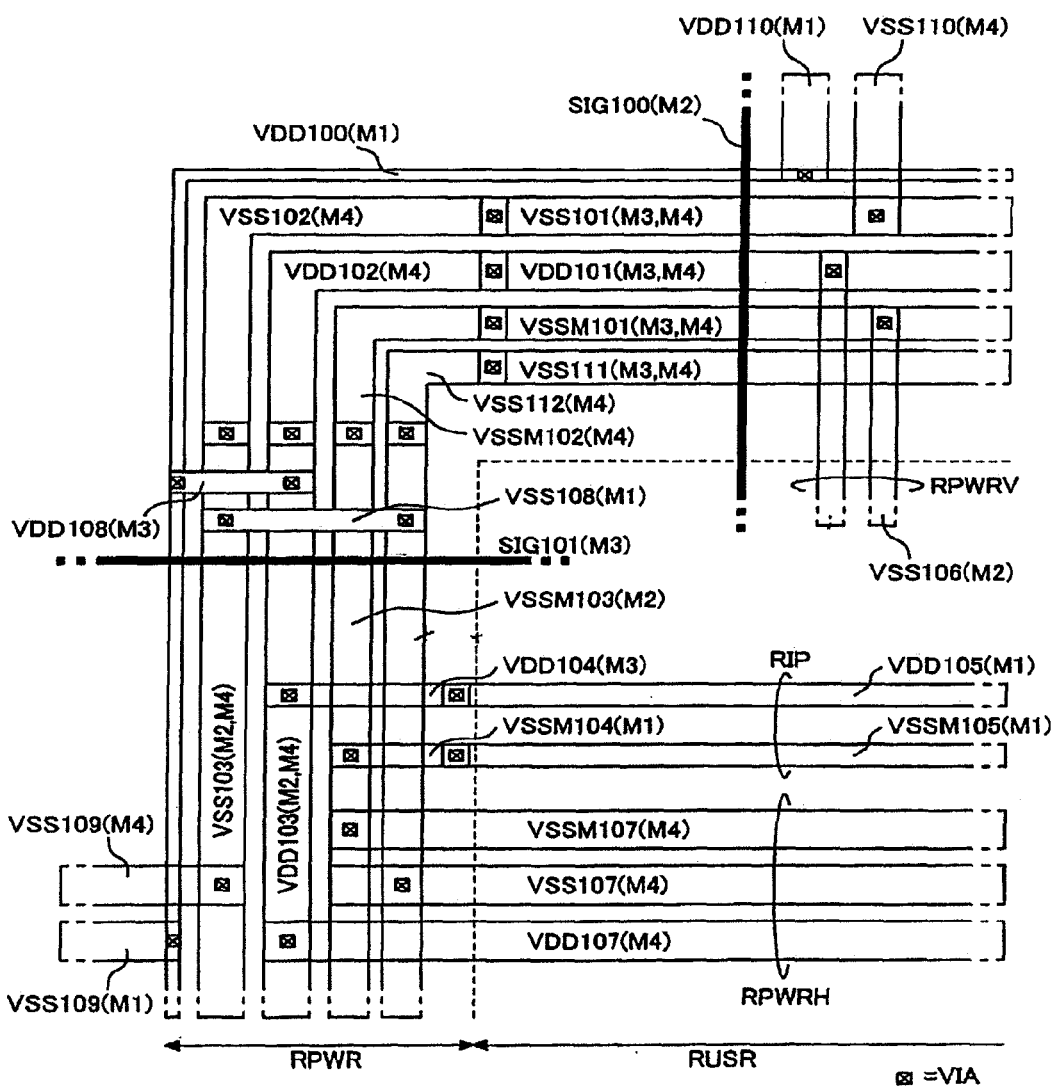
FIG. 3 is a diagram showing an example of a power net of the area AE1 shown in FIG. 1.

Desirably, the power switch SW1 should be arranged in the four-sided areas (RPWR2, RPWR4, RPWR6, and RPWR8) of the aforementioned power ring. In particular, desirably, the power switch SW1 should be arranged in the areas RPWR4 and RPWR8. As shown in FIG. 3, a power line VDD105 (M1) and a virtual ground line VSSM105 (M1) that provide each circuit module with power and a ground connection are extended crosswise. Accordingly, the effect of the wiring resistance can be reduced by arranging the power switch SW1 in the areas RPWR4 and RPWR8. On the other hand, when the power switch SW1 is arranged in the areas RPWR2 and RPWR6, the effect of the wiring resistance of a power line VDD and a ground line VSS arranged in the areas RPWR4 and RPWR8 increases. Accordingly, when the power switch SW1 is arranged preferentially in the areas RPWR4 and RPWR8 and the effect of the on-state resistance of the power switch SW1 must be reduced, the power switch SW1 should desirably be arranged in the areas RPWR2 and RPWR6 as well.

FIG. 3 shows a layout of a more specific power line VDD, ground line VSS and virtual ground line VSSM concerning the R14 part of FIG. 2. VDD100 to VDD110 are power lines, VSS101 to VSS103 and VSS107 are ground lines, and VSSM101 to VSSM107 are virtual ground lines. Line SIG100 represents only one of the wires typically that traverse a power ring lengthwise and line SIG101 represents only one of the wires typically that traverse the power ring crosswise. In FIG. 3, symbols M1 to M4 in the parentheses after each symbol designate names of wiring layers used for installing the wires. When plural symbols are provided, they show that the wiring is provided in multiple wiring layers. Layer M4 is above the wiring layer M3, M3 is above M2, and M2 is above M1, when viewed from the semiconductor substrate. Further, the symbol enclosed by a square containing an X mark designates a VIA for connecting the respective wiring layers. The portion indicated by RPWR is a power ring area and the portion indicated by RUSR is an area in which a MOS transistor constituting each circuit module is arranged.

A power ring is composed of the relatively upper wiring layers M2 to M4, disposed above a semiconductor substrate, and includes lines VDD101 to VDD103, VSS101 to VSS103, VSSM101 to VSSM103, and VSS111. Because a relatively upper wiring layer relative to the semiconductor substrate can have a wider pitch in comparison with a lower wiring layer, the wiring layer thickness can be made thick and the sheet resistance can be reduced, thereby realizing a low-resistance wiring. By using such a low-resistance wiring in a power ring, the power ring can be formed to have a low resistance, and the so-called voltage drop can be reduced.

In FIG. 3, a vertical global power line RPWRV that shunts the aforementioned power ring lengthwise is formed by plural lines. Further, a horizontal global power line RPWRH that shunts the power ring crosswise is formed by lines VDD107, VSS107, and VSSM107. The power ring can be made to have a low resistance by provision of these lines. At this stage, the arrangement interval of the vertical global power line RPWRV in a cross direction and the arrangement interval of the horizontal global power line RPWRH in a lengthwise direction are not limited in particular. Because the vertical global power line RPWRV uses the relatively lower M2 wiring layer, however, a channel for wiring a signal line of a MOS transistor constituting a circuit module will be reduced if too many of the vertical global power lines are arranged. Accordingly, the vertical global power lines should be arranged suitably every approximately 100 μm, for example. On the other hand, because the horizontal global power line RPWRH uses the relatively upper M4 wiring layer, the channel for wiring the aforementioned signal line is hardly reduced. Consequently, many horizontal global power lines RPWRH can be arranged.

A power-supply line RIP from the aforementioned power ring to a MOS transistor constituting each circuit module is formed by line VDD105 and line VSSM105 using the M1 wiring layer. A channel for wiring a signal line of the MOS transistor constituting each circuit module uses the M1 to M3 wiring layers principally. For the same reason, a power line and a ground line use the M4 wiring layer in the four-corner area of the power ring and do not use a lower wiring layer.

For simplification, only one wire VDD108 for connecting the line VDD100 and the line VDD103 electrically is shown. It is suitable to arrange multiple wires at certain intervals and connect them in low resistance. Further, the wiring with which the line VDD100 and the line VDD101 are connected directly electrically in a lengthwise direction like the line VDD108 is not shown, but they should desirably be arranged in the same manner as the line VDD108 using the M2 wiring layer. Further, for simplification, only one wire VSS108 for connecting the line VSS103 electrically is shown, but it is suitable to arrange multiple wires of the line VSS108 at certain intervals and connect them in low resistance. Further, the wiring in which the line VSS101 and the line VSS111 are connected directly electrically in a lengthwise direction like the line VSS108 is not shown, but they should desirably be arranged in the same manner as the line VSS108 using the M3 wiring layer.

Low impedance power can be supplied to each circuit module using a wiring layer efficiently according to the aforementioned layout. FIG. 3 shows an example of a configuration in which there are four wiring layers. When more wiring layers are provided, a power ring can be constituted to have an even lower resistance using the wiring layer added in the configuration of FIG. 3. Although specific usage of the wiring layer is not limited, it is suitable to supply the power and ground connection from the outside of the power ring to the power ring using the uppermost wiring layer (M4 for FIG. 3) and the lowermost wiring layer (M1 for FIG. 3). Further, the horizontal global power line RPWRH ought to be realized using the uppermost wiring layer (M4 for FIG. 3). This is because many channels for wiring a signal line of a MOS transistor constituting each circuit module are obtained.

Figure 4:
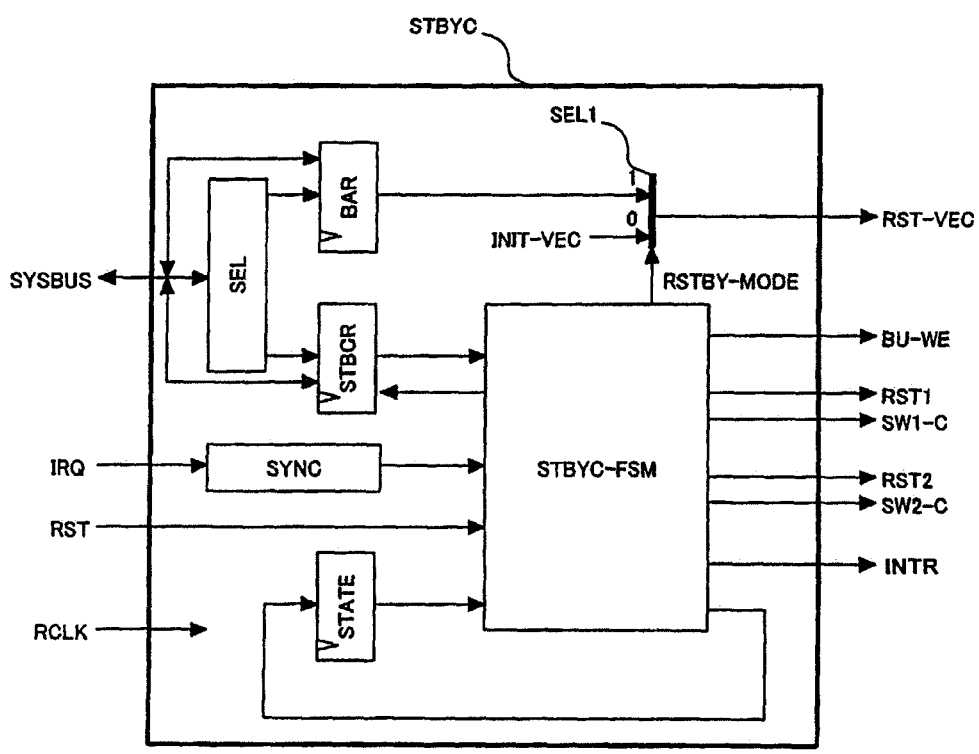
FIG. 4 is a schematic diagram showing an example of the configuration of a standby control circuit STBYC shown in FIG. 1.

FIG. 4 shows the configuration of a standby control circuit STBYC for controlling a transition operation and a return operation to the aforementioned low current mode. A system bus SYSBUS for reading and writing an internal register is connected to the standby control circuit STBYC, and an interrupt request signal IRQ, a reset signal RST, and a clock signal RCLK are input. The output of the standby control circuit STBYC includes a backup register write enable signal BU-WE, an interrupt signal INTR that posts an interrupt to a CPU after return operation from the R-standby mode, a CPU execution start address RST-VEC after reset, a reset signal RST1 of the first area AE1 and a control signal SW1-C of the power switch SW1, and a reset signal RST2 of the second area AE2 and a control signal SW2-C of the power switch SW2. In FIG. 1, though the interrupt signal INTR is directly supplied to the CPU, it can be supplied to the CPU via an interrupt controller.

The standby control circuit STBYC has a standby control register STBCR and a boot address register BAR as which serve registers that can be read and written from the system bus SYSBUS. The read and write operations from the system bus SYSBUS are controlled by a decoder DEC. The standby mode control register STBCR holds a value that corresponds to the current standby mode. Further, a transition request into each low current mode that corresponds to the writing from the system bus SYSBUS to the standby mode control register STBCR is posted. The standby control circuit STBYC in this embodiment is constituted so that a transition operation into a software standby mode, the U-standby mode and the R-standby mode, or a return operation from these modes can be controlled. With regard to the transition operation into or the return operation from the software standby mode, however, the CPU can instruct a clock stop to the CPG directly.

The boot address register BAR holds an address of an instruction that the CPU executes first when the system LSI returns from the R-standby mode and releases reset. Though this embodiment posts a transition operation request into the R-standby mode by writing it to a standby mode control register STBCR, the transition operation can be requested by utilizing a one-purpose instruction, such as a sleep instruction or a standby instruction, and combining the standby mode control register STBCR and the one-purpose instruction. In that case, this can be realized by allowing the CPU to transmit the transition operation request to the standby control circuit STBYC via a sleep request response line (not shown).

A synchronizing circuit SYNC contained in the standby control circuit STBYC synchronizes an interrupt request IRQ from the outside of a chip with an external clock signal RCLK. A current mode control sequence circuit STBYC-FSM determines the necessity for a transition operation and a return operation of a standby mode, and it outputs a transition or return operation sequence if necessary. Input is a value of a standby mode register STBCR, the interrupt request IRQ, and a state holding register STATE that indicates which step is executed in the transition operation or return operation sequence. Output is the output of the standby control circuit STBYC and the R-standby mode signal STBY-MODE that indicates whether the R-standby mode is entered at present.

When a system LSI accepts an interrupt request signal IRQ from the outside and returns from the R-standby mode, interrupt processing that corresponds to the relevant interrupt request signal IRQ must be performed after the information saved to the URAM or an external memory is returned to each circuit module located in the first area AE1. This processing is performed by executing a predetermined instruction. That is, when the system LSI returns from the R-standby mode, an address of a memory in which an instruction to be executed first is stored must be held. Accordingly, in accordance with the invention, a boot address register BAR for holding the address of the memory in which the instruction to be executed first when the system LSI returns from the R-standby mode is provided, and an execution start address is set in the boot address register BAR when the system LSI shifts to the R-standby mode. At this stage, because the execution start address when the system LSI returns from the R-standby mode can be made identical at all times, the boot address register BAR may be constituted by hardwired logic and the setting of the execution start address can be omitted when the system LSI shifts to the R-standby mode. In this embodiment, however, a software implementor can set the aforementioned execution start address freely by providing the boot address register BAR and arrange a necessary program at an arbitrary position in a memory space when the system LSI returns to the R-standby mode.

Meanwhile, because the return operation from a U-standby mode always involves reset processing, a boot address INIT-VEC is executed first. In accordance with the invention, a selector SEL1 is provided, then an R-standby mode signal RSTBY-MODE is output from a current mode sequence circuit STBYC-FSM and an RST-VEC selects either a BAR or the boot address INIT-VEC for a normal reset operation. Accordingly, when a system LSI performs reset processing to return from the U-standby mode, the function of outputting the boot address INIT-VEC and executing an address instruction held in the boot address register BAR only for a return operation from an R-standby mode is implemented. In a return operation from software standby, after an internal clock signal starts being supplied, an instruction is read from an address that corresponds to the type of an interrupt request IRQ in the same interrupt processing as a normal operation mode.

Further, in this embodiment, when the system LSI returns from the R-standby mode or U-standby mode, an execution start address is determined through a standby control circuit STBYC and is input to the CPU. Otherwise, a register that holds the execution start address is provided in the CPU after the system LSI return from it. This register can be saved and recovered using the backup register BUREG.

Figure 5:
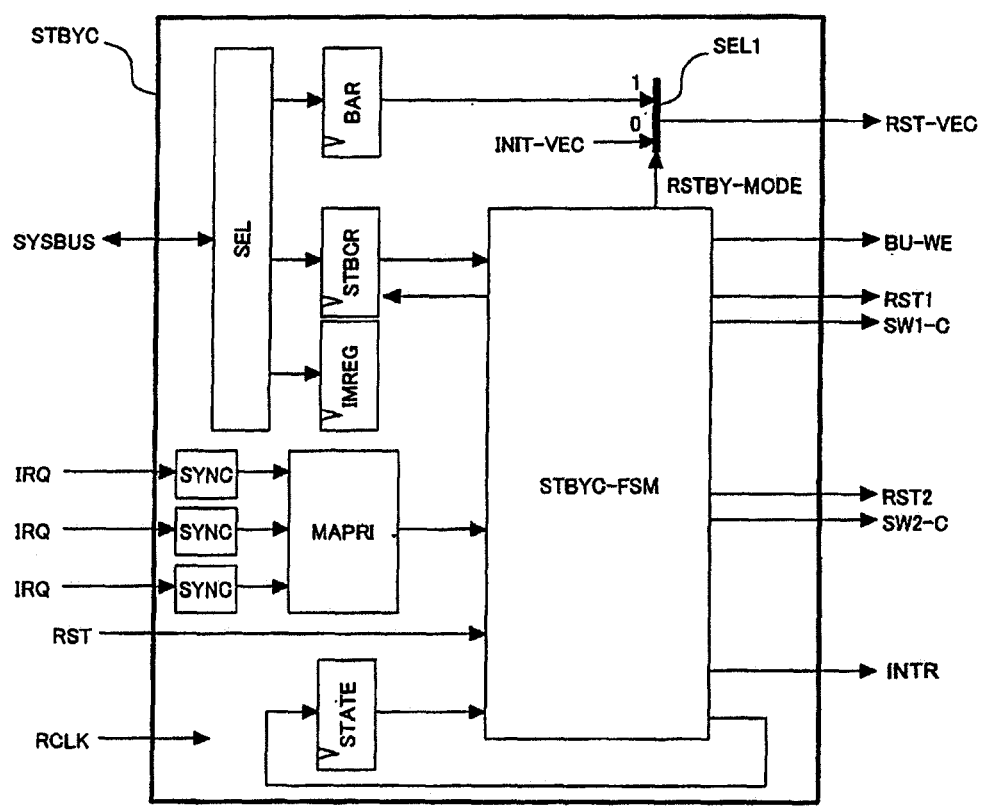
FIG. 5 is a schematic diagram showing a further example of the configuration of the standby control circuit STBYC shown in FIG. 1.

FIG. 5 shows another embodiment of a standby control circuit STBYC. FIG. 5 differs from FIG. 4 in that, when multiple interrupt request signals are input in parallel, a priority decision circuit MAPRI is employed for determining which interrupt request is to be accepted preferentially, so that it can accommodate multiple interrupt requests. That is, in FIG. 4, the return operation from the R-standby mode or U-standby mode corresponds to only one interrupt request signal IRQ, while this embodiment can return from the multiple interrupt requests. Further, this embodiment provides a mask register IMREG. By setting an interrupt request to be masked in the mask register IMREG, when a system LSI shifts to each standby mode, the interrupt request accepted for every shifted standby mode can be changed, and so it is possible to handle a built-in system flexibly. In FIG. 5, though a description thereof is omitted, the boot address register BAR and the standby mode control register STBCR enable reading and writing via the system bus SYSBUS in the same manner as FIG. 4. Further, the mask register IMREG enables reading and writing via the system bus SYSBUS in the same manner.

Figure 6:
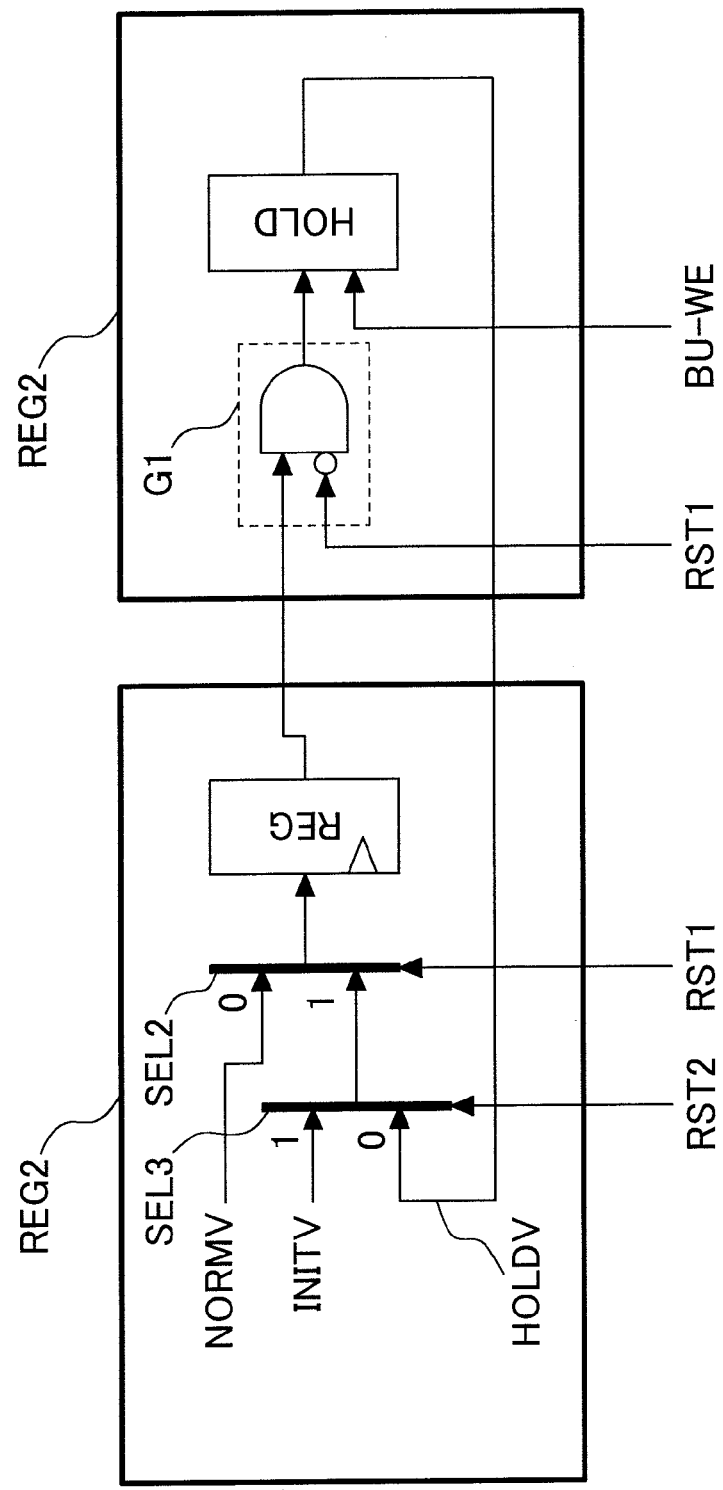
FIG. 6 is a schematic diagram showing the configuration of a register backup mechanism shown in FIG. 1.

FIG. 6 shows the configuration of the backup register BUREG that stores a state when a system LSI shifts to the R-standby mode. Because the backup register BUREG is located in the second area AE2 and the second area is conductively connected to the power supply even in the R-standby mode, the backup register holds a value. On the other hand, because the register REG2 of the peripheral circuit module IP2 is located in the first area AE1, the power is shut off in the R-standby mode and the value held therein is lost. If the reset of the CPU is released when the system LSI returns from the R-standby mode, instruction fetch is started from an address of the boot address register BAR. Accordingly, a setup register for a module that determines a pin state held by the peripheral circuit module IP2 or the system LSI in which the CPU needs to fetch an instruction is saved and recovered by hardware. Such a peripheral circuit module includes a clock generation circuit, a bus controller, a memory controller, an interrupt controller, and a pin function controller. Further, a register that disables reading and writing by software must be saved and recovered by hardware if the CPU needs to fetch the instruction.

A holding latch HOLD in the backup register BUREG holds a value of a REG and stores the value at the rising edge of a signal BU-WE. A gate G1 masks an indefinite value which the REG outputs when the power of the first area AE1 is shut off. This embodiment masks the indefinite value by using the reset signal RST1 of the first area AE1 which is fixed at 1 when the power of the first area AE1 is shut off. If the indefinite value the register outputs can be masked, this portion can be constituted freely.

On the other hand, the register REG2 of the peripheral circuit module IP2 inserts selectors SEL2 and SEL3 into the input of a register REG, and a value written to the register REG is selected from a normal operation value NORMV, a value HOLDV immediately before the power is shut off, and an initial reset value INITV. The selection signals of the selectors SEL2 and SEL3 use the reset signal RST1 of a first area and the area reset signal RST2 of a second area. First, when the reset signal RST1 of the first area is 0, because the first area AE1 contained in the peripheral circuit module IP2 operates normally, the selector SEL2 selects the value NORMV as a value written to the REG. Subsequently, when the reset signal RST1 of the first area AE1 is 1 and the reset signal RST2 of the second area is 0, because the R-standby mode is being selected, the value HOLDV is selected as the value written to the REG. When both the reset signals RST1 and RST2 are 1, because both the first area AE1 and the second area AE2 are being initialized, the value INITV is selected as the value written to the REG. Although this embodiment controls a selector using a reset signal, a selection signal can be output from the standby control circuit STBYC. By constituting a backup register in this manner, the register can be saved and returned at high speed when the system LSI shifts to the R-standby mode or returns from the R-standby mode. Further, the information held in the register which cannot be read by software can also be saved in the backup register BUREG. This embodiment saves only the register of the IP2 that becomes necessary when an instruction is fetched in the backup register BUREG, but it can also save the register of the IP1 that does not become necessary when the instruction is fetched. In this case, the area increases because the save operation or return operation to the URAM or an external memory by software becomes unnecessary, and so fast operation is enabled.

Figure 7:
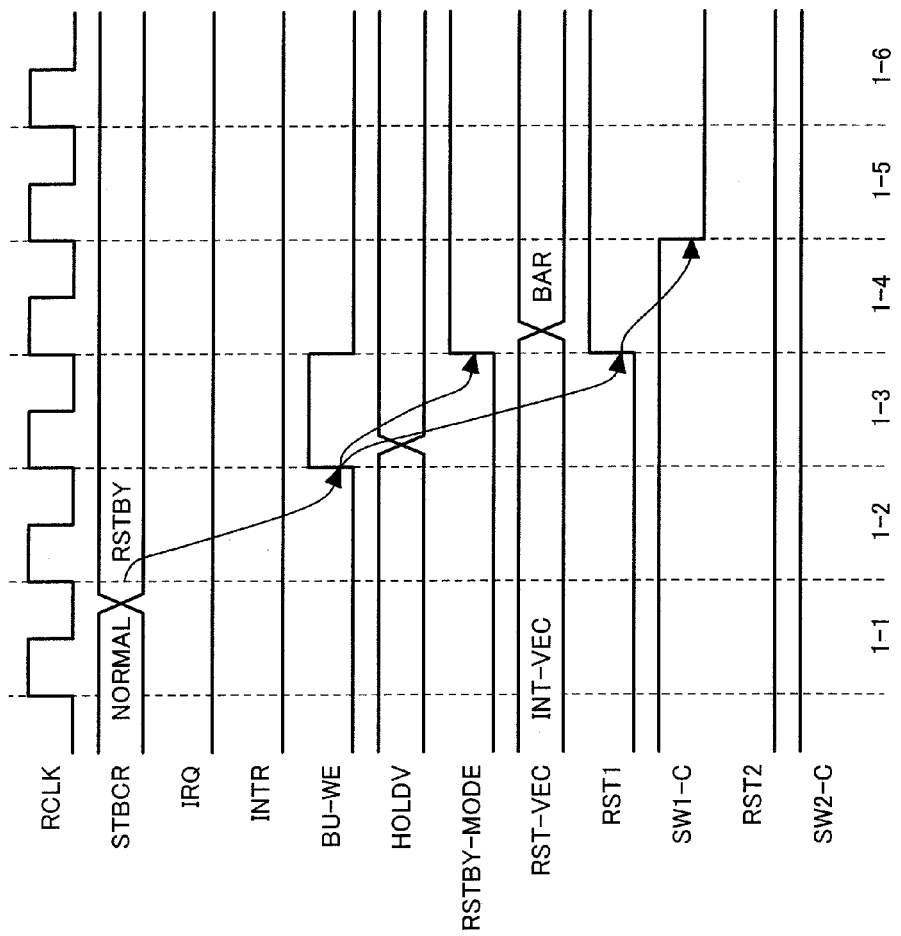
FIG. 7 is a timing diagram showing a transition operation sequence into an R-standby mode according to one embodiment of the present invention.
Figure 8:
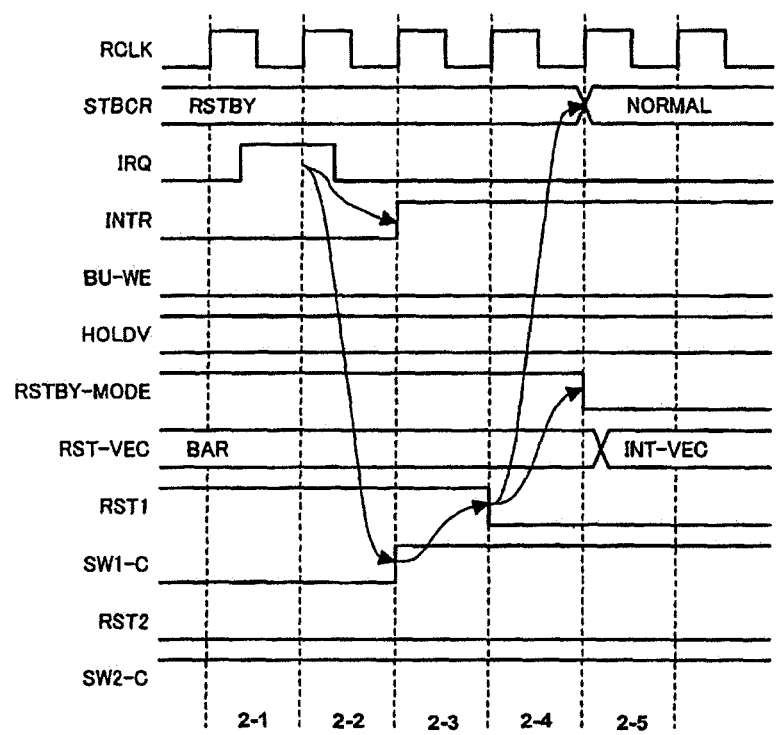
FIG. 8 is a timing diagram showing a return operation sequence from the R-standby mode according to one embodiment of the present invention.

FIGS. 7 and 8 show the sequences of the transition operation into the R-standby mode and the return operation to the normal operation. First, FIG. 7 shows the sequence in which the system LSI shifts from a normal operating state (NORMAL) to the R-standby mode RSTBY. The value RSTBY that indicates the R-standby mode is written from a system bus to a standby mode control register STBCR in a cycle 1-1. A standby control circuit STBYC reads the value in a cycle 1-2, then sets a backup write enable signal BU-WE to 1 in a cycle 1-3 and stores the value of the register REG2 of the peripheral circuit module IP2 in the backup register BUREG. As a result, in the cycle 1-3, a hold latch value HOLDV becomes a value of the register REG2 of the peripheral circuit module IP2 before the system LSI shifts to the R-standby mode. Subsequently, in a cycle 1-4, because an R-standby mode signal RSTBY-MODE and the reset signal RST1 of a first area are set to 1, a module located in the first area AE1 is reset and stops. Subsequently, in a cycle 1-5, the control signal SW1-C of the power switch SW1 is set to 0, then the power of the first area AE1 is shut off and the transition operation is completed.

FIG. 8 shows a sequence in which the system LSI is returned from the R-standby mode by an interrupt. In a cycle 2-1, the interrupt occurs and an interrupt request signal IRQ is set to 1. A standby control circuit STBYC receives this signal in a cycle 2-2 and asserts an interrupt request INTR after the system LSI returns from the R-standby mode. At the same time, the control signal SW1-C of the power switch SW 1 is set to 1 and the power of the first area AE1 turns on. Subsequently, in a cycle 2-3, when the reset signal RST1 is set to 0, the reset of the first area AE1 is released and the operation of the CPU starts from a cycle 2-4. At this occasion, because the value of RST-VEC is an address of the boot address register BAR, an operation start address of the CPU is the address of the boot address register BAR instead of an INIT-RST-VEC. Subsequently, in a cycle 2-5, an R-standby mode signal RSTABY-MODE is updated to 0 and a value of a standby control register STBCR is updated to NORMAL to indicate a normal operation mode, then the return operation is completed.

In this embodiment, even if the system LSI shifts to the R-standby mode, the URAM is provided in the second area AE2 in which the power is not shut off and the content thereof is held in the R-standby mode. Accordingly, a register of a peripheral circuit module that is not saved and recovered by hardware can be saved and recovered using the URAM. First, a register value can be saved by executing a program so that the value of the register to be saved and recovered can be transmitted to the URAM before it is written to the standby mode control register STBCR that instructs the transition operation into the R-standby mode. In this case, to recover the register value, the program transmitted to the register that recovers a value of the URAM is installed in an address set for the boot address register BAR. The save operation and recovery operation are unnecessary for the register that need not hold the value in the R-standby mode. Accordingly, the number of registers to be saved and recovered can be selected when the system LSI must return from the R-standby mode at a higher speed.

Figure 9:
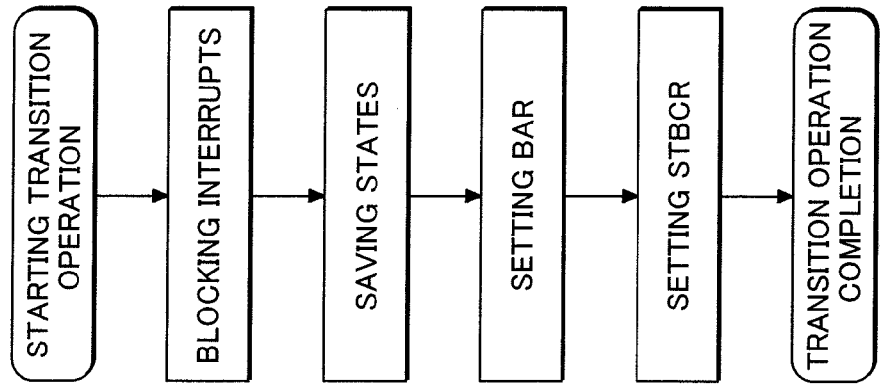
FIG. 9 is a flow diagram showing a flow of processing accompanied by a R-standby transition operation according to one embodiment of the present invention.
Figure 10:
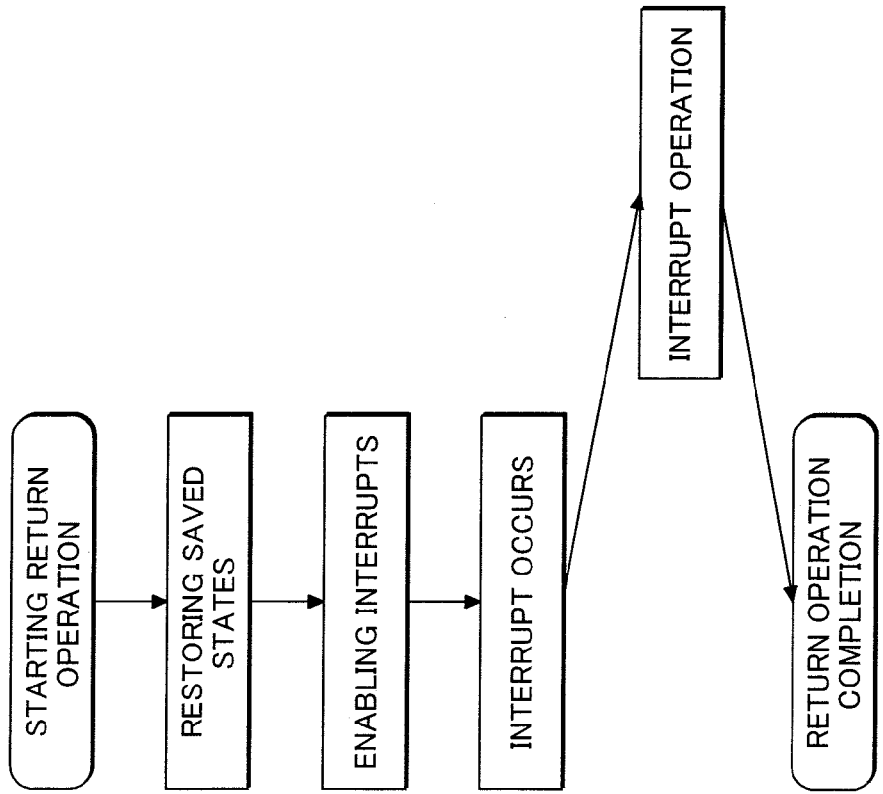
FIG. 10 is a flow diagram showing the flow of processing accompanied by a R-standby return operation according to one embodiment of the present invention.

FIGS. 9 and 10 show the processing performed by software when the system LSI shifts to and returns from the R-standby mode. FIG. 9 shows a flow of processing for the transition operation. In this flow, first, an attempt is made to disable an interrupt and not to change the value of a register to be saved. Subsequently, the content of a cache is overwritten to a memory and the cache is disabled. Then, the value of the register that is not saved and recovered by hardware is transferred to the URAM and an address of an instruction to be executed first when the system LSI returns from the R-standby mode is set for the boot address register BAR. Subsequently, when a value that indicates the R-standby mode is written to the standby control register STBCR, the transition operation into the R-standby mode is performed. When the transition operation into the standby mode is instructed using an additional instruction (a sleep instruction SLEEP or a standby instruction STBY), the instruction is executed at this stage.

FIG. 10 shows a flow of processing when the system LSI returns from the R-standby mode. This processing is assigned to an address set in the boot address register BAR that was specified by the R-standby mode transition processing. First, the value of a register stored in the URAM is transferred to each register in the transition processing. Accordingly, the value of the register saved by software is returned. Subsequently, the cache is disabled. Subsequently, when an interrupt is enabled, an interrupt request INTR to be outputted by a standby control circuit STBYC is accepted and normal interrupt processing is performed. When this interrupt processing terminates, the R-standby return processing is completed. Because the processing shown here is executed by software, necessary processing is added and unnecessary processing can be deleted freely.

The realization of the R-standby mode in this embodiment has been described above, but a software standby mode or a U-standby mode can be realized without changing the configuration. First, the software standby mode is realized by stopping the clock in the same manner as before. Subsequently, the U-standby mode can be realized by shutting off the power in the second area AE2 as well as the power of the first area AE1 when the system LSI carries out the transition operation through the standby control circuit STBYC and the resetting of the return operation externally.

FIG. 11 shows an example of the presence of the power off state in each standby, transition and return triggers condition, and the comparison between the time for return and an operating current. In the R-standby mode, the time for return increases approximately 10 times and the operating current decreases to 1/100 in comparison with a software standby mode (S-standby). Further, in comparison with the U-standby mode, the operating current increases approximately 10 times and the time for return decreases to 1/100.

Figure 12:
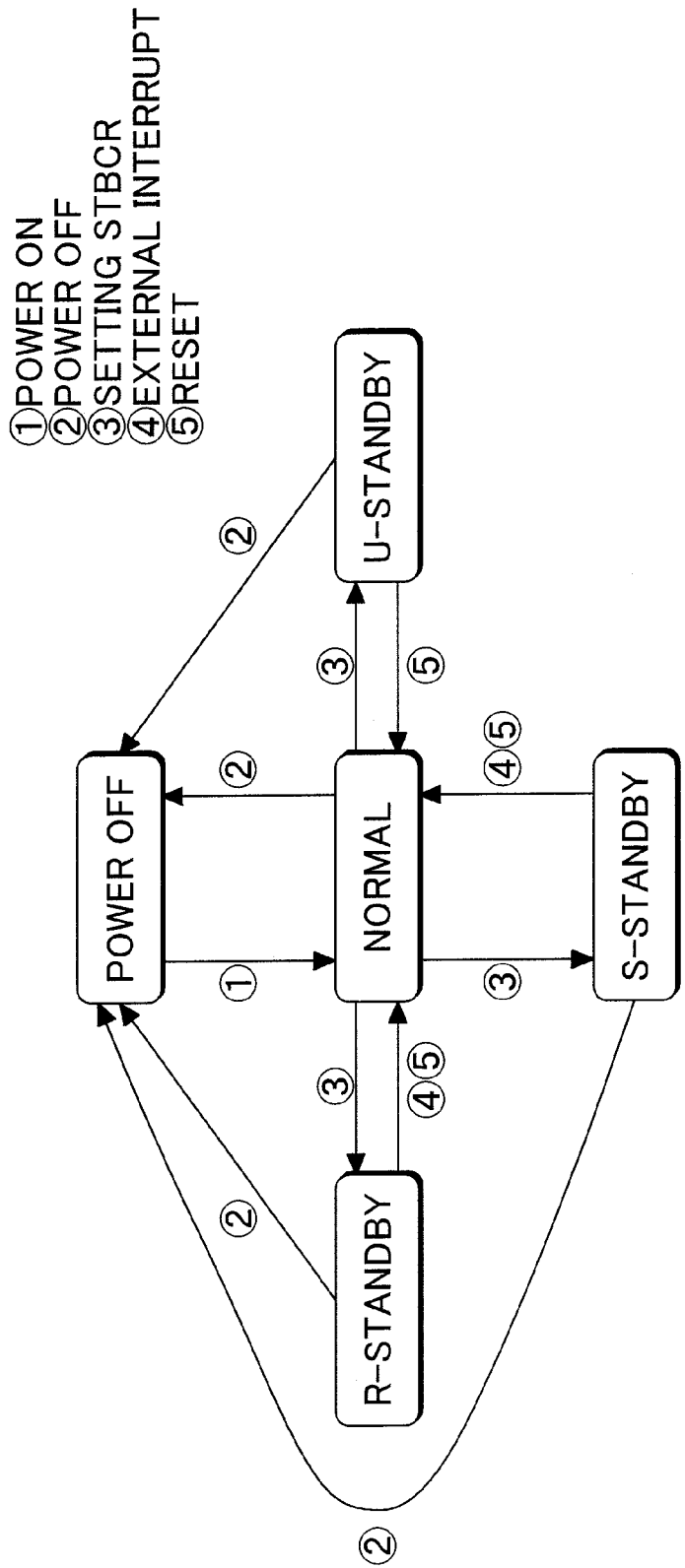
FIG. 12 is a diagram showing the transition operation between standbys according to one embodiment of the present invention.

FIG. 12 shows the transition operation between operation modes. The R-standby mode shifts to a normal operation mode in response to an external interrupt or reset. In the case of the external interrupt, however, its corresponding interrupt processing is performed. In the case of a reset, reset processing is performed. The U-standby mode is shifted to the normal operation mode by the reset processing.

Figure 13:
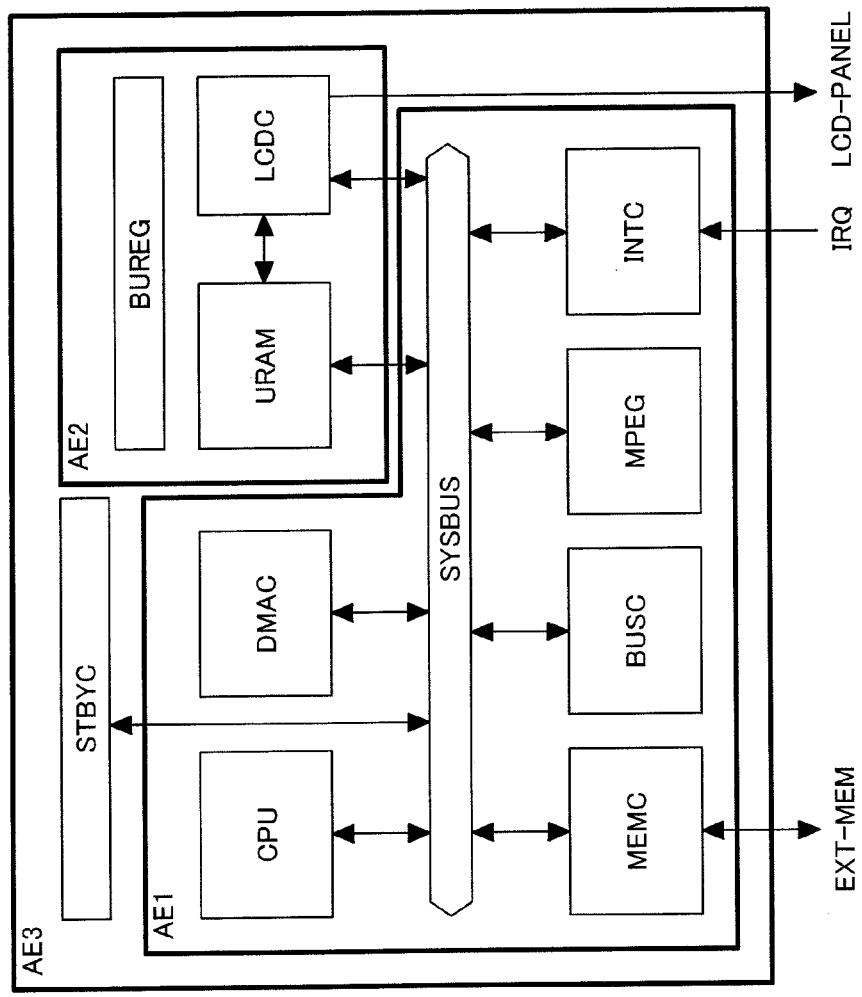
FIG. 13 is a block diagram showing an example of the configuration of a system LSI for a cellular phone to which the present invention applies.

FIG. 13 shows the configuration of a system LSI for a cellular phone to which the present invention applies. This system LSI adds a DMA controller DMAC, a memory controller MEMC, a bus state controller BUSC, an interrupt controller INTC, an MPEG accelerator MPEG to the first area AE1, and adds an LCD controller LCDC to the second area AE2 in addition to the module discussed in connection with the embodiment. Here, though the invention is not limited in particular, the DMA controller DMAC and the MPEG accelerator MPEG correspond to the peripheral module circuit IP1, and they can return from the R-standby mode even if the internal state thereof is not held. The memory controller MEMC, the bus state controller BUSC, and the interrupt controller INTC correspond to the peripheral circuit module IP2, and the register contained in these controllers is held in a backup register BUREG.

Further, in this configuration, because the display of an external LCD panel LCD-PANEL continues in the R-standby mode, the LCD controller LCDC is added to the second area AE2 in which the power is not shut off even in the R-standby mode.

Embodiments of the present invention have been described above, but the present invention enables various modifications based on its technical ideas. To give an example, the first area AE 1 may be divided into multiple areas and modes of shutting off the power of the CPU, the IP1, and the IP2 may be provided.

As described above, a fast operation or low power consumption of a system LSI can be realized.

What is claimed is:

1. An information processing system formed on a single semiconductor substrate, the information processing system comprising:
 a processing unit;
 a peripheral circuit module;
 a bus coupled to said processing unit and said peripheral circuit module; and a boot address register coupled to said bus, wherein said information processing system includes a first operation mode and a second operation mode having an operating current which is lower than that of said first operation mode, wherein said boot address register holds an address of an instruction to be executed by said processing unit first when the boot address register returns from said second operation mode to said first operation mode, wherein said address is output from said boot address register to the processing unit when said information processing system shifts from said second operation mode to said first operation mode, wherein said boot address register is able to be written from said bus to replace said address held by said boot address register with another address, an information holding circuit that holds a value of a register contained in said peripheral circuit module, wherein said information holding circuit holds, in said second operation mode, information about the register contained in said peripheral circuit module, and, transfers information held in said information holding circuit to the register contained in said peripheral circuit module when the information holding circuit shifts from said second operation mode to said first operation mode, and wherein when an interrupt request is posted from the outside of said information processing system in said second operation mode, said information processing system performs interrupt processing corresponding to said interrupt request.

2. The information processing system according to claim 1, wherein said processing unit and said peripheral circuit module are controlled so that the supply of the current can be stopped in said second operation mode, and wherein said boot address register is controlled so that the current can be supplied in said second operation mode.

3. The information processing system according to claim 1, further comprising:

a third operation mode in which an operating current is lower than that of said second operation mode, wherein said processing unit and said peripheral circuit module are controlled in said third operation so that the supply of the current can be stopped, and wherein said processing unit performs reset processing that sets an initial state of said information processing system when an interrupt request is posted from the outside of said information processing system in said third operation mode.

4. The information processing system according to claim 1, wherein the address held by the boot address register can be set freely, and wherein a necessary program can be arranged at an arbitrary position in a memory space.

* * * * *